US012772123B2

(12) United States Patent
Sharma et al.

(10) Patent No.: US 12,772,123 B2
(45) Date of Patent: Oct. 20, 2026

(54) WIRELESS TELECOMMUNICATIONS SYSTEM AND METHOD

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 320 days.

(21) Appl. No.: 18/580,621

(22) PCT Filed: Jul. 26, 2022

(86) PCT No.: PCT/EP2022/071002

§ 371 (c)(1),
(2) Date: Jan. 19, 2024

(87) PCT Pub. No.: WO2023/011996

PCT Pub. Date: Feb. 9, 2023

(65) Prior Publication Data

US 2024/0334257 A1 Oct. 3, 2024

(30) Foreign Application Priority Data

Aug. 3, 2021 (EP) .................................... 21189515

(51) Int. Cl.

*H04W 36/00* (2009.01)
*H04W 36/36* (2009.01)
*H04W 36/08* (2009.01)

(52) U.S. Cl.

CPC ... *H04W 36/0064* (2023.05); *H04W 36/0009* (2018.08); *H04W 36/362* (2023.05); *H04W 36/087* (2023.05)

(58) Field of Classification Search

CPC ......... H04W 36/0064; H04W 36/0009; H04W 36/362; H04W 36/087; H04W 36/36
See application file for complete search history.

(56) References Cited

U.S. PATENT DOCUMENTS 11,228,959 B2 * 1/2022 Li .................... H04W 36/0009
2019/0246446 A1 * 8/2019 Cao .................... H04L 41/0895
(Continued)

FOREIGN PATENT DOCUMENTS

WO 2019/246446 A1 12/2019
WO 2021/140032 A1 7/2021
WO 2021/262077 A1 12/2021

OTHER PUBLICATIONS

CATT, "Group Handover in Inter IAB donor-CU", 3GPP TSG-RAN3 Meeting #109-e, R3-204733, E-meeting, Aug. 17, 2020-Aug. 28, 2020, 5 pages.
(Continued)

*Primary Examiner* — Khawar Iqbal
(74) *Attorney, Agent, or Firm* — XSENSUS LLP

(57) ABSTRACT

An infrastructure equipment for providing a wireless interface to a communications node in a wireless communications network, the infrastructure equipment configured to support a wireless backhaul configuration for the communications node, wherein in the wireless backhaul configuration the communications node is configured to provide a wireless backhaul between one or more communications devices and the infrastructure equipment, the infrastructure equipment configured to: transmit one or more handover requests including first node configuration information for the communications node and first device configuration information for each of the one or more communications devices; receive one or more handover request acknowledgements; determine second device configuration information based on the one or more handover request acknowl-
(Continued)

edgements; and transmit, to the first communications device, the second device configuration information for the first communications device.

18 Claims, 13 Drawing Sheets

(56) References Cited

U.S. PATENT DOCUMENTS

| | | | | |
|---|---|---|---|---|
| 2021/0084506 | A1* | 3/2021 | Kimba Dit Adamou | H04L 45/28 |
| 2021/0227435 | A1* | 7/2021 | Hsieh | H04W 36/087 |
| 2022/0015000 | A1* | 1/2022 | Fujishiro | H04W 40/24 |
| 2022/0046486 | A1* | 2/2022 | Shrestha | H04W 36/0009 |
| 2022/0368474 | A1* | 11/2022 | Abedini | H04W 72/23 |
| 2022/0394562 | A1* | 12/2022 | Wang | H04W 36/0083 |
| 2023/0107577 | A1* | 4/2023 | Shrestha | H04L 1/1621<br>370/331 |
| 2023/0269630 | A1* | 8/2023 | Teyeb | H04W 36/0016<br>370/331 |
| 2023/0308972 | A1* | 9/2023 | Sun | H04B 7/18541 |
| 2023/0413125 | A1* | 12/2023 | Vaze | H04W 36/00226 |
| 2024/0064595 | A1* | 2/2024 | Park | H04W 36/0055 |

OTHER PUBLICATIONS

Holma et al., "LTE for UMTS—OFDMA and SC-FDMA Based Radio Access", John Wiley & Sons, Ltd. 2009, 232 pages.

International Search Report and Written Opinion mailed on Nov. 23, 2022, received for PCT Application PCT/EP2022/071002, filed on Jul. 26, 2022, 14 pages.

3rd Generation Partnership Project, "Technical Specification Group Radio Access Network; Study on further enhancements to LTE Device to Device (D2D), User Equipment (UE) to network relays for Internet of Things (IoT) and wearables; (Release 15)", 3GPP TR 36.746 V1.1.0, Aug. 2017, pp. 1-57.

Ericsson, "(TP for NR-IAB BL CR for TS 38.423): Corrections to BL CR", 3GPP TSG-RAN WG3 Meeting #108-e, R3-203816, Jun. 1, 2020-Jun. 11, 2020, 14 pages.

* cited by examiner

WIRELESS TELECOMMUNICATIONS SYSTEM AND METHOD

CROSS-REFERENCE TO RELATED APPLICATIONS

The present application is based on PCT filing PCT/EP2022/071002, filed Jul. 26, 2022, which claims priority from European Patent Application No. 21189515.6, filed Aug. 3, 2021, the entire contents of each are incorporated herein by reference.

BACKGROUND

Field of the Disclosure

The present disclosure relates to methods and apparatus for the transmission of data on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

As radio technologies continue to improve, for example with the development of 5G ("New Radio"), the possibility arises for these technologies to be used not only by infrastructure equipment to provide service to wireless communications devices in a cell, but also for interconnecting infrastructure equipment to provide a wireless backhaul.

SUMMARY OF THE DISCLOSURE

Aspects of the invention are defined by the independent claims.

In a first aspect there is provided an infrastructure equipment for providing a wireless interface to a communications node in a wireless communications network, the infrastructure equipment configured to support a wireless backhaul configuration for the communications node, wherein in the wireless backhaul configuration the communications node is configured to provide a wireless backhaul between one or more communications devices and the infrastructure equipment, the infrastructure equipment comprising: a transmitter configured to transmit, via a wireless access interface, signals to the communications node; a receiver configured to receive, via the wireless access interface, signals from the communications node; and a controller configured to determine to handover the communications node to the other infrastructure equipment; wherein the controller is further configured to operate with the transmitter and receiver to: transmit, to the other infrastructure equipment, one or more handover requests including first node configuration information for the communications node and first device configuration information for each of the one or more communications devices; receive, from the other infrastructure equipment, one or more handover request acknowledgements; determine second device configuration information based on the one or more handover request acknowledgements, wherein the second device configuration information for a first communications device of the one or more communications devices is different to the first device configuration information for the first communications device; transmit, via the communications node and to the first communications device, the second device configuration information for the first communications device.

In a second aspect there is provided an infrastructure equipment for providing a wireless interface to a communications node in a wireless communications network, the infrastructure equipment comprising: a transmitter configured to transmit, via a wireless access interface, signals to the communications node and to another infrastructure equipment, the infrastructure equipment configured to support a wireless backhaul configuration for a communications node, wherein in the wireless backhaul configuration communications node is configured to provide a wireless backhaul between one or more communications devices and the infrastructure equipment; a receiver configured to receive, via the wireless access interface, signals from the communications node and the other infrastructure equipment; and a controller is further configured to operate with the transmitter and receiver to: receive, from the other infrastructure equipment, one or more handover requests including first node configuration information for the communications node and first device configuration information for each of the one or more communications devices; transmit, to the other infrastructure equipment, one or more handover request acknowledgements, wherein the one or more handover request acknowledgements enable the other infrastructure equipment to determine second device configuration information based on the one or more handover request acknowledgements, wherein the second device configuration information for a first communications device of the one or more communications devices is different to the first device configuration information for the first communications device.

Particular embodiments are set out in the dependent claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

Like reference numerals designate identical or corresponding parts throughout the drawings.

DETAILED DESCRIPTION OF THE EMBODIMENTS

Long Term Evolution (LTE) Radio Access Technology (4G)

Figure 1:
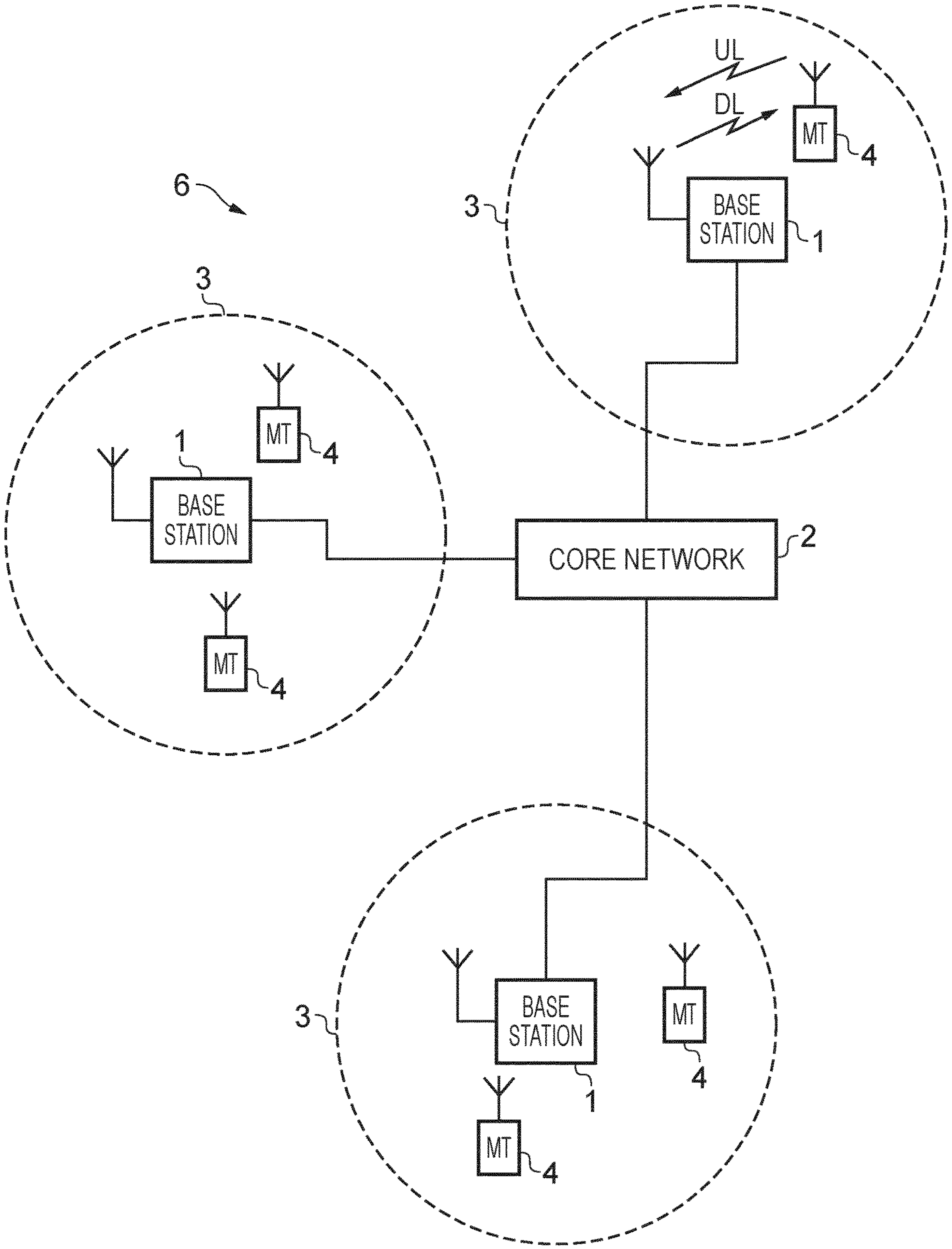
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas, remote radio heads, amplifiers, etc. Collectively, one or more base stations may form a radio access network.

Data is transmitted from the base stations 1 to the communications devices 4 within their respective coverage areas 3 via a radio downlink. Data is transmitted from the communications devices 4 to the base stations 1 via a radio uplink. The core network 2 routes data to and from the communications devices 4 via the respective base stations 1 and provides functions such as authentication, mobility management, charging and so on. A communications device may also be referred to as a mobile station, user equipment (UE), user terminal, mobile radio, terminal device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
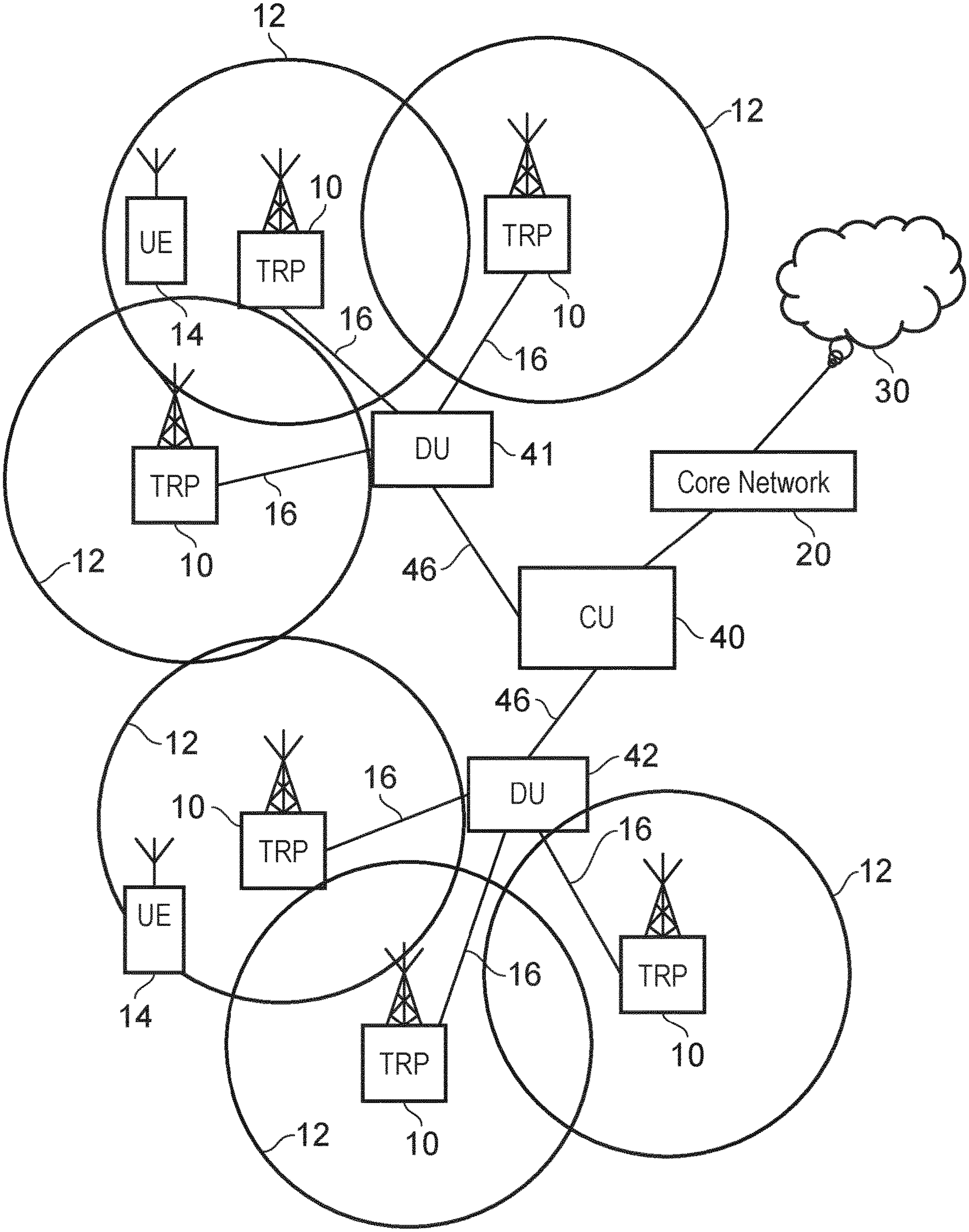
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to a core network 20 which may contain all other functions required for communicating data to and from the wireless communications devices and the core network 20. The core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2 and of other networks discussed herein in accordance with embodiments of the disclosure which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated, therefore, that operational aspects of an NR network (for example in relation to specific communication protocols and physical channels for communicating between different elements) may be different to those known from LTE or other known mobile telecommunications standards. However, it will also be appreciated that each of the core network component, base stations and communications devices of an NR network will be functionally similar to, respectively, the core network component, base stations and communications devices of an LTE wireless communications network.

In terms of broad top-level functionality, the core network 20 connected to the NR telecommunications system represented in FIG. 2 may be broadly considered to correspond with the core network 2 represented in FIG. 1, and the central unit 40 and associated DUs 41, 42/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the CU 40, DUs 41, 42 and/or TRPs 10. Communications devices 14 are represented in FIG. 2 within the coverage area of respective communication cells 12. These communications devices 14 may thus exchange signalling with the CU 40 via the TRP 10 associated with their respective communications cells 12.

It will further be appreciated that FIG. 2 represents merely one example of a proposed architecture for an NR-based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a CU 40, DU 41, 42 and/or TRP 10 of the kind shown in FIG. 2 which is adapted to provide functionality in accordance with the principles described.

Figure 3:
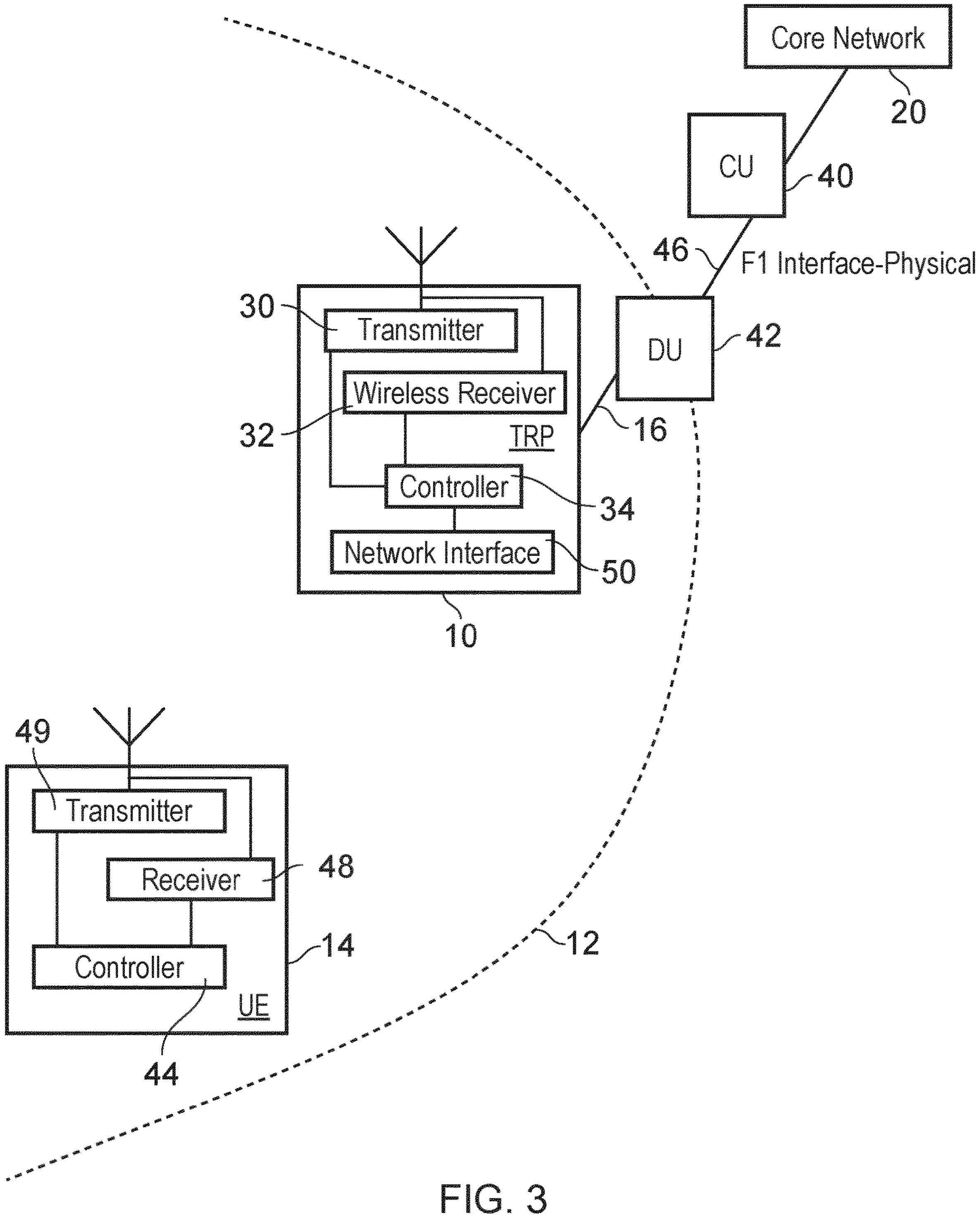
FIG. 3 schematically represents some components of the wireless telecommunications system shown in FIG. 2 in more detail which may be configured to operate in accordance with embodiments.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which is configured to control the transmitter 30 and the receiver 32 to transmit radio signals to and receive radio signals from one or more UEs 14 within a cell 12 formed by the TRP 10. As shown in FIG. 3, an example UE 14 is shown to include a corresponding wireless transmitter 49, wireless receiver 48 and a controller or controlling processor 44 which is configured to control the transmitter 49 to transmit signals representing uplink data to the wireless communications network via the wireless access interface formed by the TRP 10 and the receiver 48 to receive downlink data as signals transmitted by the transmitter 30 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance, for example, with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory.

The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473 and, for example, may be formed from a fibre optic or other wired high bandwidth connection. In one example, the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Figure 4:
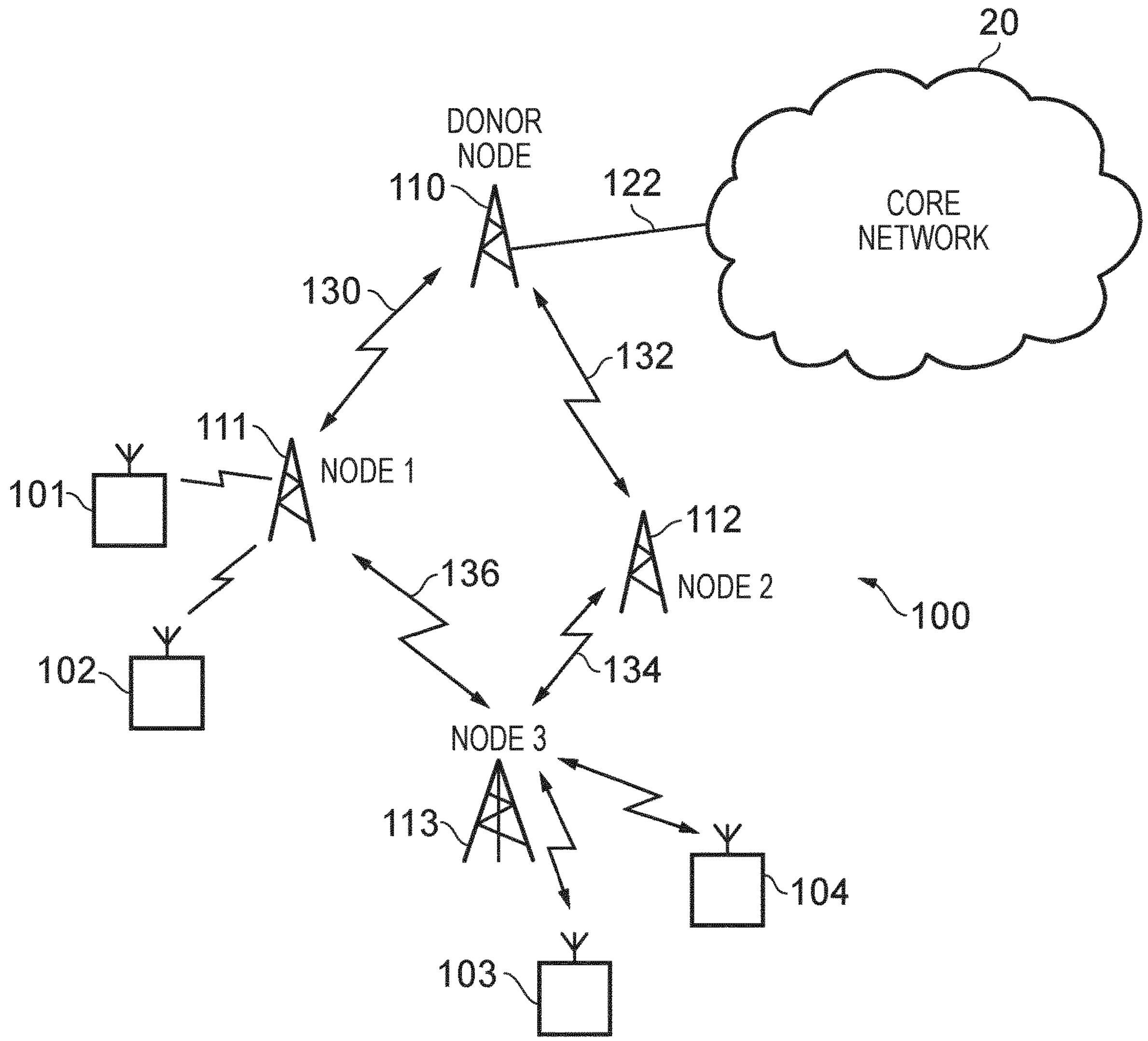
FIG. 4 schematically represents some elements of a NR-type wireless telecommunications system which may be configured to operate in accordance with embodiments.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise a TRP 10 having the physical connection 16 to the DU 42 in combination with the DU 42 having the physical connection to the CU 40 by means of the F1 interface 46. The CU 40, in turn, is connected by means of a physical connection (e.g. fibre optic) to the core network 20.

However, there is no direct physical connection between any of the second infrastructure equipment 111, the third infrastructure equipment 112, and the fourth infrastructure equipment 113 and the core network 20. As such, it may be necessary or otherwise determined to be appropriate for data received from a communications device (i.e. uplink data) or data for transmission to a communications device (i.e. downlink data) to be transmitted to or from the core network 20 via other infrastructure equipment, such as the first infrastructure equipment 110, which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment, which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment acts as relay nodes on the backhaul link, they may also provide service to communications devices. The relay node at the end of the route which is the infrastructure equipment controlling the cell in which the communications device is obtaining service is referred to as an 'end node'.

Hence, for clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route which is a next hop when used for the transmission of data via that route from a wireless communications device to a core network. That is, 'upstream node' is used to refer to a relay node or a donor node to which uplink data is transmitted for transmission to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink/downlink data from/to a given communications device. This is referred to as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

The donor node 110 and the second to fourth infrastructure equipment acting as the Nodes 1 to 3 111, 112, 113 may communicate with one or more other nodes by means of one or more inter-node wireless communications links (which may also be referred to "wireless backhaul communications links"). For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and, in particular, in some arrangements of the present technique, all of the inter-node wireless communications links 130, 132, 134, 136 are provided by a shared wireless access interface.

A wireless access interface, which provides an inter-node wireless communications link, may also be used for communications between an infrastructure equipment and a communications device which is served by the infrastructure equipment. For example, the fourth wireless communications device 104 may communicate with the Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques.

Examples of wireless access interface standards include the 3GPP-specified General Packet Radio Service (GPRS)/Enhanced Data rates for Global Evolution (EDGE) ("2G"), Wideband Code-Division Multiple Access (WCDMA)/Universal Mobile Telecommunications System (UMTS) and related standards such as High Speed Packet Access (HSPA) and HSPA+ ("3G"), LTE and related standards including LTE-Advanced (LTE-A) ("4G"), and NR ("5G"). Techniques that may be used to provide a wireless access interface include one or more of time-division multiple access (TDMA), frequency-division multiple access (FDMA), orthogonal frequency-division multiple access (OFDMA), single-carrier frequency-division multiple access (SC-FDMA), code-division multiple access (CDMA). Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Mobile Relay Node Handover

If a relay node is mobile (i.e. movable, e.g. attached to a moving vehicle), it may need to perform a handover operation to switch from being served from one upstream node to another upstream node in order to maintain a satisfactory connection to the network and, by extension, for further downstream nodes or terminal devices which connect to the network via the relay node to maintain a satisfactory connection to the network.

To make handover more efficient, group handover can sometimes be used. Group handover involves the upstream node serving the relay node (and all downstream devices connected to the relay node) sending a group handover command to the relay node. The node serving the relay node therefore only has to send one handover command to cover both the relay node and downstream devices served by the relay node rather than having to send a separate handover command to each device. This reduces network overhead. An example of group handover is discussed in [2].

Figure 5A:
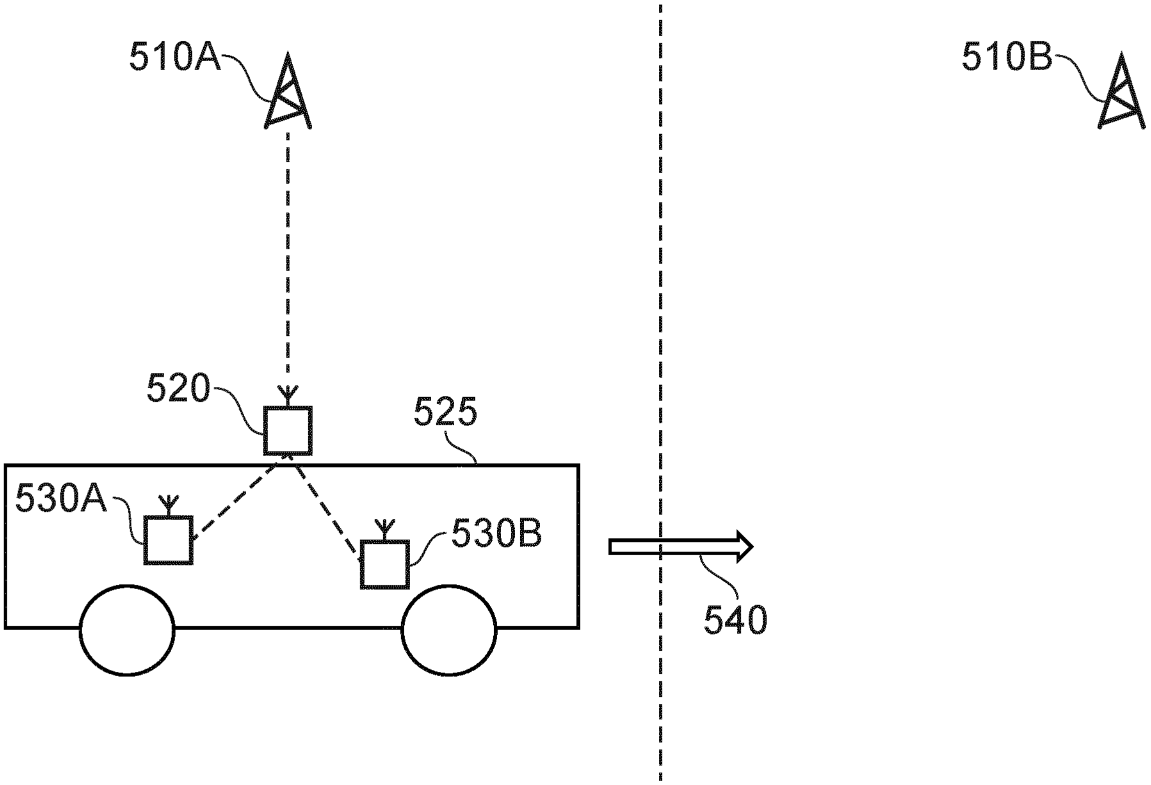
FIGS. 5A and 5B schematically represent a first handover scenario to which embodiments may be applied.
Figure 5B:
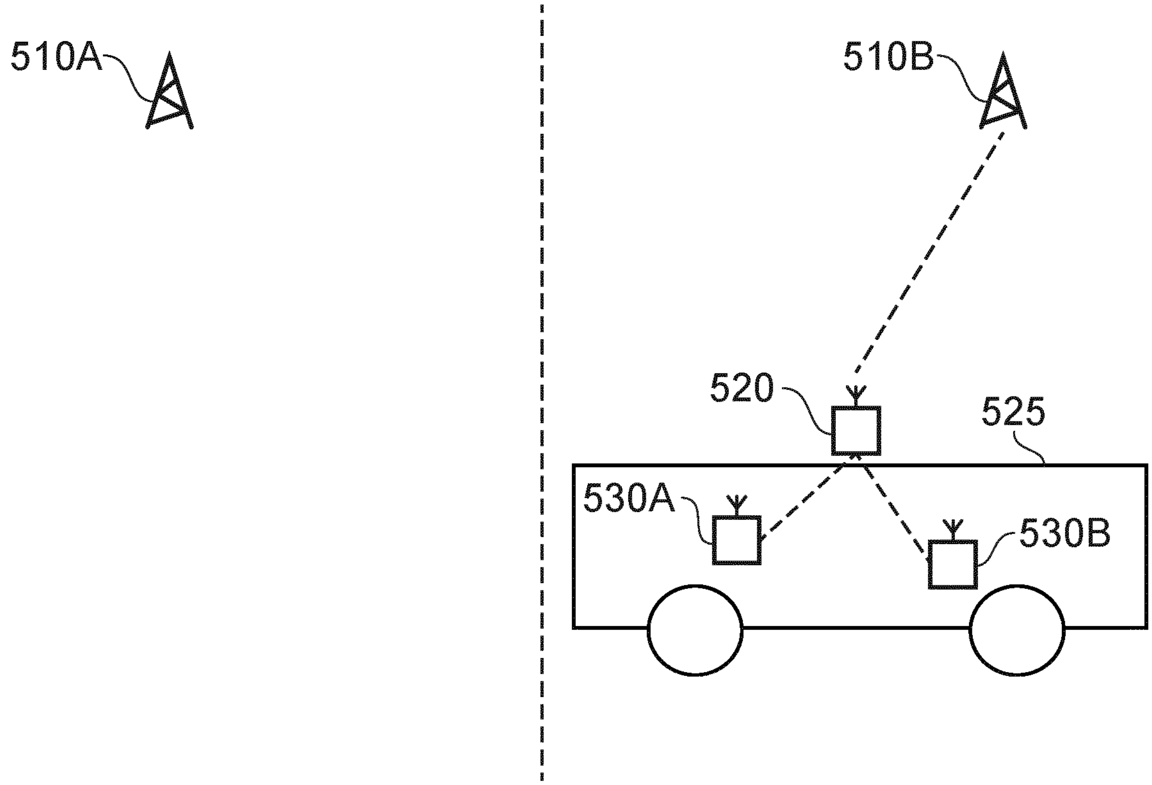

FIG. 5A shows an example arrangement 500 whereby a relay node 520 is attached to a vehicle 525 and thus may be classed as a mobile relay node. The vehicle may a bus, train, aeroplane, or car, or substantially any other form of vehicle. While in this example, the mobile relay node 520 is attached to a vehicle, other implementations for a mobile relay node may be used. Mobile relay node 520 serves two UEs 530A, 530B which may, for example, be located inside the vehicle 525 bus (e.g. because they belong to passengers travelling in the vehicle), however the relay node 520 may serve no UEs, one UE, or substantially any number of UEs. The mobile relay node 520 is currently served by upstream node 510A (which may be referred to as a "source node"). However, as the vehicle 525 moves in the direction indicated by arrow 540 away from source node 510A and towards upstream node 510B (which may be referred to as a "target node"), it will be necessary for the relay node 520 (or rather the UEs 530A, 530B) to be handed over from node 510A to node 510B, as shown in FIG. 5B. In the example of FIG. 5A, both nodes 510A and 510B support the use of JAB functionality for the relay node 520. If a group handover is used for relay node 520 and the UEs 530A, 530B, this will maintain satisfactory network connectivity for the relay node 520 and UEs 530A and 530B which travel with the relay node 520.

Figure 6:
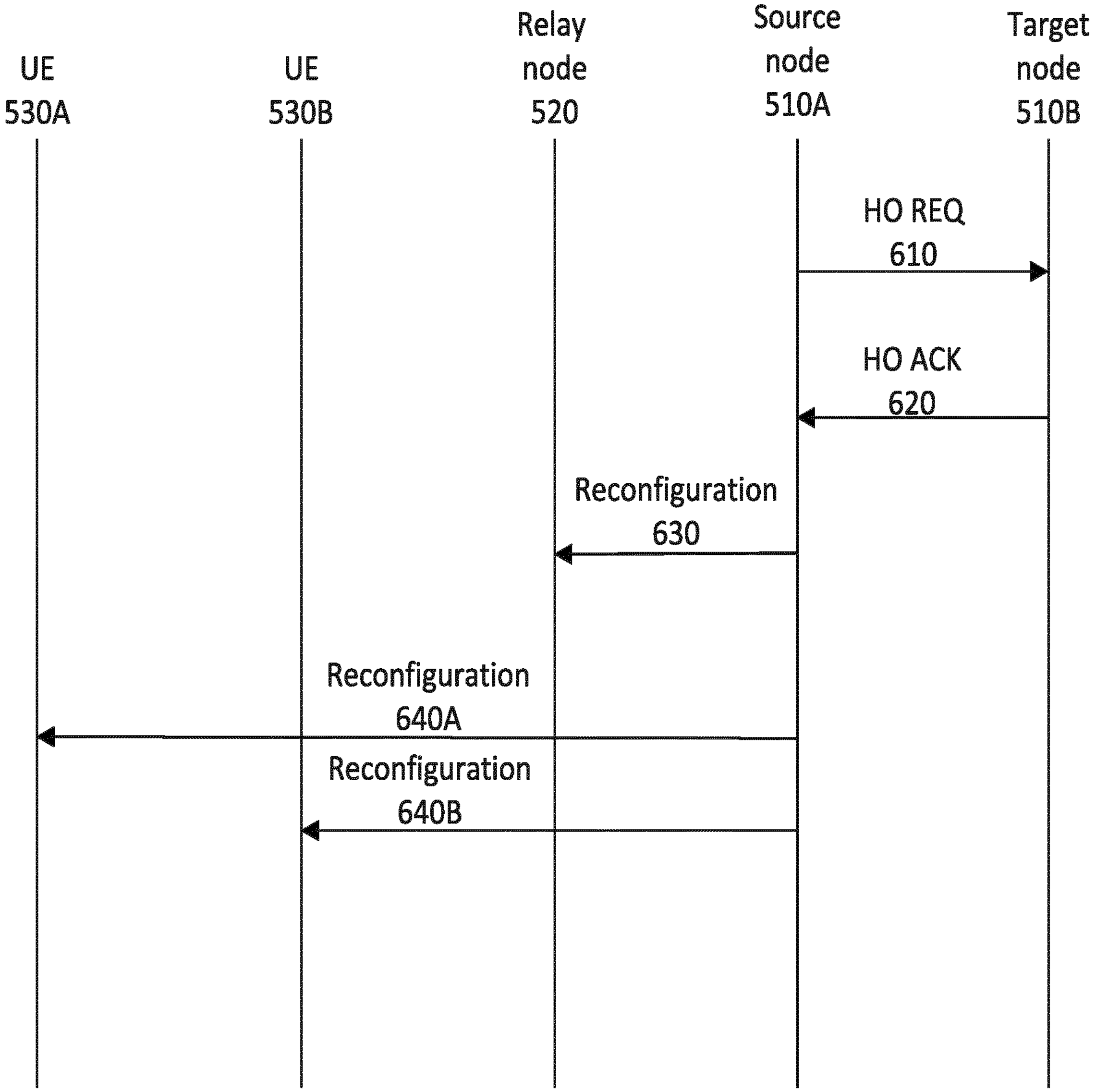
FIG. 6 illustrates signal transmissions in a first example handover process.

During the handover process, which is shown in FIG. 6, the source node 510A will transmit a handover request (HO REQ) 610 to the target node 510B. This request may include configuration information for the source node 510A, such as channel configuration information between source node 510A and relay node 520 (e.g. Radio Link Control (RLC) channel configuration information), address configuration information (e.g. Internet Protocol (IP) address information), and backhaul configuration information (e.g. Backhaul Adaptation Protocol (BAP) configuration information), as well as configuration information for each of the UEs 530A, 530B served by the relay node 520.

Target node 510B accepts the handover request and sends a handover request acknowledgment (HO ACK) 620 to the source node 510A which may include configuration information (i.e. configuration for the relay node 520 and/or target node 510B, such as channel configuration information between target node 510B and relay node 520, address configuration information, and backhaul configuration information), as well as configuration information for each of the UEs 530A, 530B served by the relay node 520.

The configuration information for the target node 510B may be the same as the configuration information for the source node 510A. Alternatively, the configuration information for the target node 510B may be different to the configuration information for the source node 510A. In this scenario, the source node 510A may then transmit a reconfiguration message 630 to the relay node 520, including the configuration information for the target node 510B (e.g. a Radio Resource Control (RRC) reconfiguration message). The relay node 520 may therefore connect to the target node 510B and send a signal, such as through an RRC reconfiguration complete message, to the target node 510B. The UEs 530A, 530B connected to the relay node 520 maintain their connection to the relay node 520 during this handover process.

The various transmission and receiving steps of the present examples may be carried out by a transmitter, such as transmitter 30,49 described above, and a receiver, such as receiver 32, 48 described above. The transmitter may be considered to include both a wireless interface and a wired interface, or may be considered to include multiple wireless interfaces and multiple wired interfaces. The transmitter may also be considered to include a plurality of interfaces such that, for example, the same interface does not necessarily transmit signals to both the relay node 520, and the source/target nodes 510, but these plurality of interfaces may nonetheless be referred to as "a transmitter". Similarly, the receiver may be considered to include both a wireless interface and a wired interface, or may be considered to include multiple wireless interfaces and multiple wired interfaces. The receiver may also be considered to include a plurality of interfaces such that, for example, the same interface does not necessarily receive signals from both the relay node 520, and the source/target nodes 510, but these plurality of interfaces may nonetheless be referred to as "a receiver".

In general, configuration information for each of the UEs 530A, 530B served by the relay node 520 is unchanged during the handover process. As such, it is not necessary to transmit configuration information for the UEs during the handover process, as the UEs 530A, 530B remain connected to the relay node 520. Accordingly, the relay node 520 handover is generally transparent to the UEs 530A, 530B.

The present example, however, allows the UEs 530A, 530B to be provided with revised configuration information, where necessary. For example, the handover may result in a change of CU (such as CU 40 described earlier). In this case, RRC, Packet Data Convergence Protocol (PDCP) and/or security keys for UEs (which may be hosted at CUs) may require changing for the UEs 530A. However, the configuration of the UEs 530A, 530B may be changed for other reasons.

In such an example where it is necessary or desirable to change the configuration of the UEs during handover, target node 510B may indicate that the UE configuration is to be revised and may include the revised UE configuration information within the handover request acknowledgement transmitted from target node 510B to source node 510A. Source node 510A determines the revised UE configuration information and transmits the revised UE configuration information to the UEs 530A, 530B (via the relay node 520) in reconfiguration messages 640A, 640B. For example, the revised UE configuration information for UEs 530A, 530B may be included in RRC reconfiguration message to the respective UEs 530A, 530B. While the revised UE configuration information is sent to the UEs 530A, 530B via the relay node 520, the transmission is initiated by the source node 510A, such that the relay node 520 is not transparent to the UEs 530A, 530B. The UEs 530A, 530B may then send a signal (such as an RRC reconfiguration complete message) to the target 510B, for example after a Random Access Channel (RACH) procedure has been completed. In some cases, the UEs 530A, 530B will skip the RACH procedure, as the synchronization between the UEs 530A, 530B and the relay node 520 has not changed, and the UEs 530A, 530B may therefore be instructed to skip the RACH procedure by the source donor 510A.

Accordingly, as can be seen from the above discussion, it is possible for handover of a relay node 520 from a source donor 510A to a target 510B donor to be completed (as shown in FIGS. 5A and 5B), whilst allowing the configuration of UEs 530A, 530B to be changed without disconnecting the UEs 530A, 530B from the relay node 520.

In some scenarios it may not be possible for group handover to be used in the manner described above. For example, a mobile relay node may enter an area where JAB functionality for a mobile relay node is not supported by the infrastructure equipment in that area. Accordingly, the donor node is not able to support the JAB functionality of the mobile relay node. Alternatively, the mobile relay node may enter an area in which JAB functionality is technically supported, but where a given donor node will not accept (i.e. will not support) handover of the mobile relay node due to operational reasons. For example, it may be determined not to admit the mobile relay node due to congestion in the network or at the donor node. In this manner, a target node may support JAB functionality for some relay nodes, but not for other relay nodes. In another example, the mobile relay node may enter a network managed by a different operator which may not accept a mobile relay node of a different network operator for policy reasons.

Figure 7A:
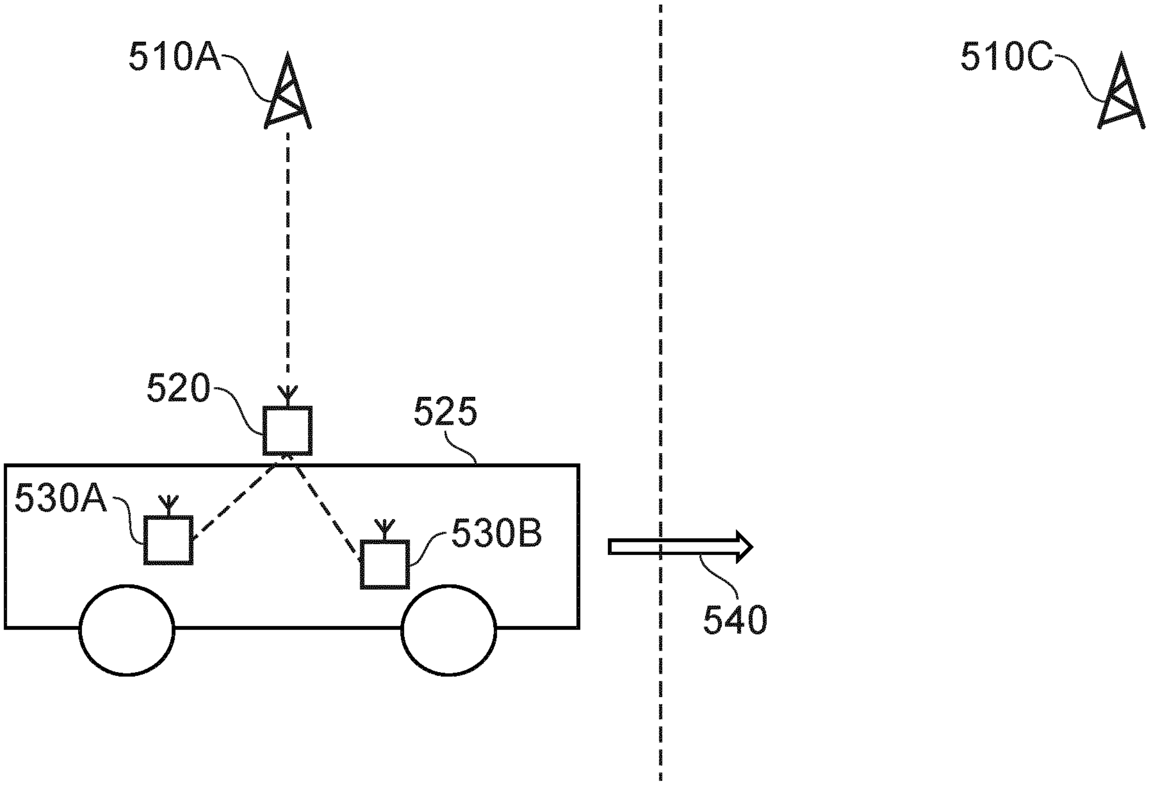
FIGS. 7A and 7B schematically represent a second handover scenario to which embodiments may be applied.

FIG. 7A shows an example arrangement 700 where the individual elements are the same as shown in FIG. 5A, except that target node 510B has been replaced by a node 510C that will not support the JAB functionality of the mobile node 520. For conciseness, this node 510C that does not support the IAB functionality may also be referred to as a "target node". As the target node 510C will not support the JAB functionality of the mobile node 520, the target node 510C effectively operates as a more conventional gNB.

Figure 7B:
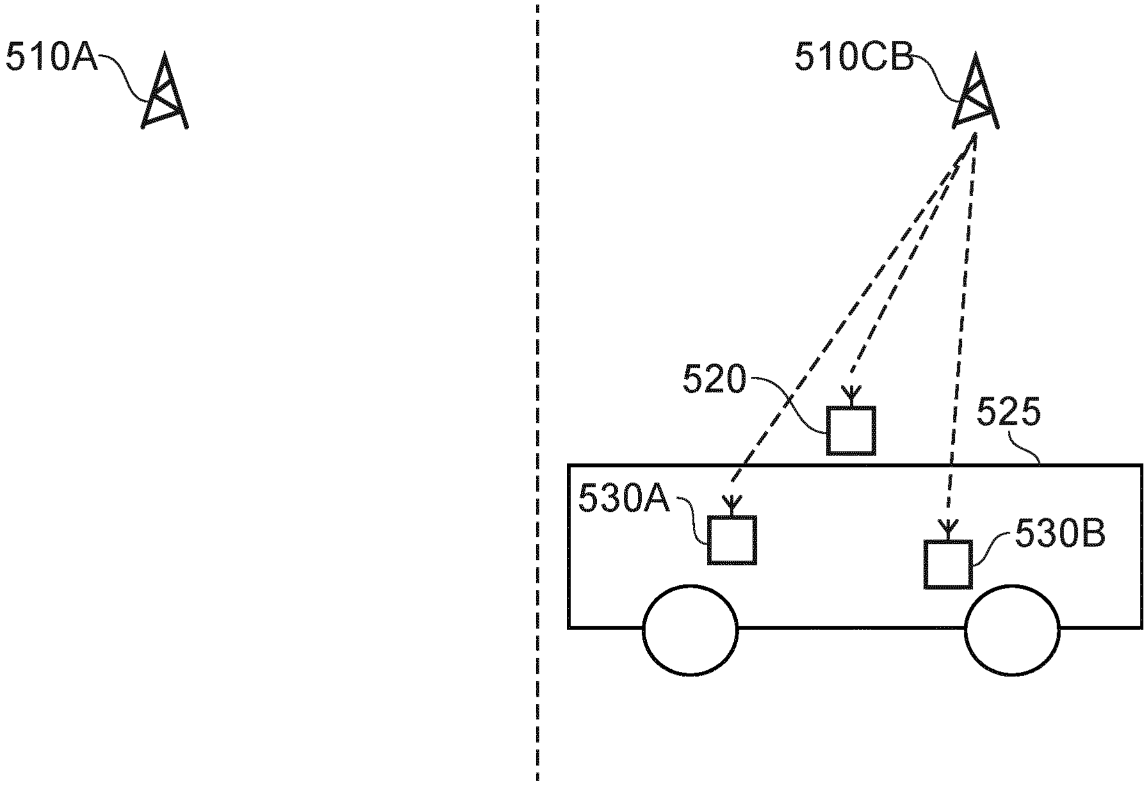

As the vehicle 525 containing rely node 520 moves in the direction indicated by arrow 540 away from source node 510A and towards target node 510C, it may be necessary for the UEs 530A, 530B (and the relay node 520) to be handed over from node 510A to node 510C, as shown in FIG. 7B. The precise manner in which this is achieved may depend on the reason why the target node 510C will not support the JAB functionality of the relay node 520. In particular, it may be relevant whether the target node 510C is technically incapable of supporting the JAB functionality (i.e. the target node 510C is a legacy device) or whether the target node 510C will support the JAB functionality (e.g. due to congestion of the network or target node 510C) despite a technical capability to do so.

Figure 8:
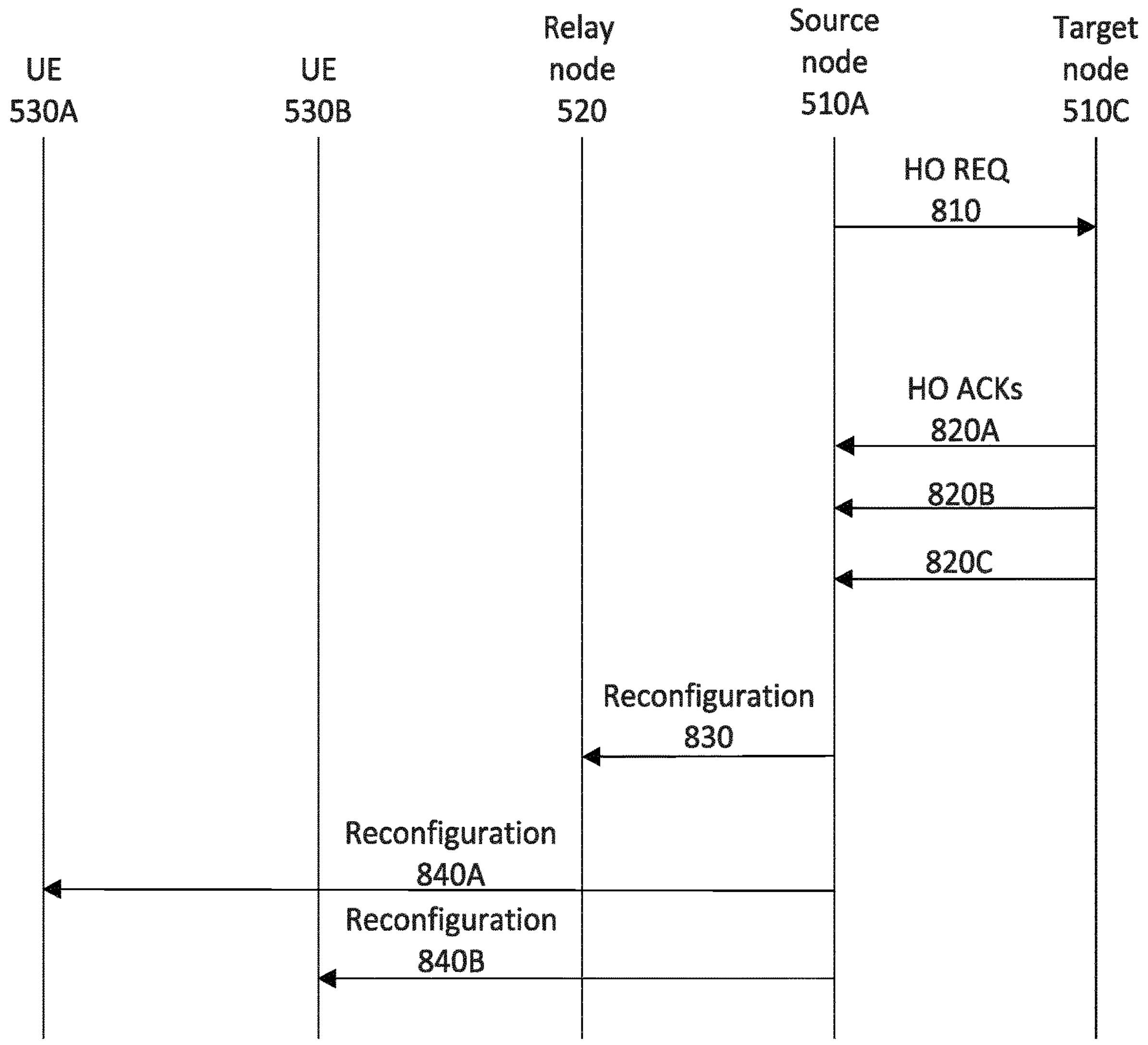
FIG. 8 illustrates signal transmissions in a second example handover process.

FIG. 8 shows a process for handover of the relay node 520 and the UEs 530A, 530B from the source node 510A to the target node 510C, where target node 510C is technically capable of supporting the JAB functionality of the relay node 520, but will not support the JAB functionality, for example due to operational or policy reasons (e.g. congestion). Source node 510A transmits a handover request 810 to target node 510C. The handover request 810 includes configuration information for the UEs 530A, 530B connected to the relay node 520 in a similar manner to handover request 610 described above.

In response, the target node 510C transmits to the source node 510A, a handover request acknowledgement 820A for UE 530A and a handover request acknowledgement 820B for UE 530B (i.e. a handover request acknowledgement 820 for each of the UEs 530 connected to the relay node 520). As such, the source node 510A may receive multiple handover request acknowledgments in response to a single handover request. Based on the handover request acknowledgements 820, the source node 510A may determine a new configuration for the UEs 530A, 530B (for example the new configurations may be included in the handover request acknowledgements 820A, 820B) and may transmit signals 640A, 640B including the new configuration to the UEs 530A, 530B in a similar manner as described above in relation to FIGS. 5 and 6. In the new configuration, the UEs 530A, 530B connect directly to the target node 510C, as shown in FIG. 7B. The UEs 530A, 530B may also transmit, to the target node 510C, a reconfiguration complete message (e.g. an RRC reconfiguration complete message).

The handover request 810 transmitted from the source node 510A to the target node 510C may also include configuration information for the relay node 520, in a similar manner to handover request 610 described above. The target node 510C may then transmit to the source node 510A a further handover request acknowledgement 820C for the relay node 520. The source node 510A may further determine a new configuration for the relay node 520 (as the target node 510C will not support the JAB functionality of the relay node 520), for example where the relay node 520 is to operate as a conventional UE connected to the target node 510C. The new configuration for the relay node 520 may be determined based on the handover request acknowledgement 820C, or the new configuration for the relay node 520 may be determined by the source node 510A in advance of sending the handover request 810 (e.g. if the source node 510A has determined that the target node 510C will not support the JAB functionality of the relay node 520 before sending the handover request 810, as will be described below). The source node 510A may then transmit a signal (reconfiguration) 630 to the relay node 520 containing the new configuration for the relay node 520. In some examples, the handover request 810 includes multiple handover requests. In particular, the handover request may include a separate handover request for each of the UEs 530A, 530B, and may in some cases additionally include a further handover request for the relay node 520.

In some examples, the handover request process may utilise existing formats for the handover (HO REQ) and handover request acknowledgement (HO ACK) messages. However, in other examples, the handover request may take a different format to existing signalling techniques. For example, the present disclosure contemplates examples where, in response to receiving a handover request 810 from the source node 510A, the target node 510C may issue a single handover request acknowledgement, despite not supporting the JAB functionality of the relay node 520 (e.g. for operational or policy reasons). This single handover request acknowledgement may correspond to each of the UEs 530A, 530B and the relay node 520. As such, the source node 510A may be able to determine new configuration information for each of the UEs 530A, 530B and the relay node 520 based on the single handover request acknowledgement. In some examples, the single handover request acknowledgment may include new configuration information for each of the UEs 530A, 530B and the relay node 520. As such, the source node 510A may transmit new configuration information to the UEs 530A, 530B and/or the relay node 520 based on a single handover request acknowledgement.

Conventional handover request acknowledgment formats may not allow for only a single handover request acknowledgement to be issued for all of the UEs 530A, 530B and the relay node 520. As such, the terms "handover request" and "handover request acknowledgement" within this disclosure should generally not be construed as referring to a specific message format, but rather as encompassing substantially any message format which provides the functionality described.

Figure 9:
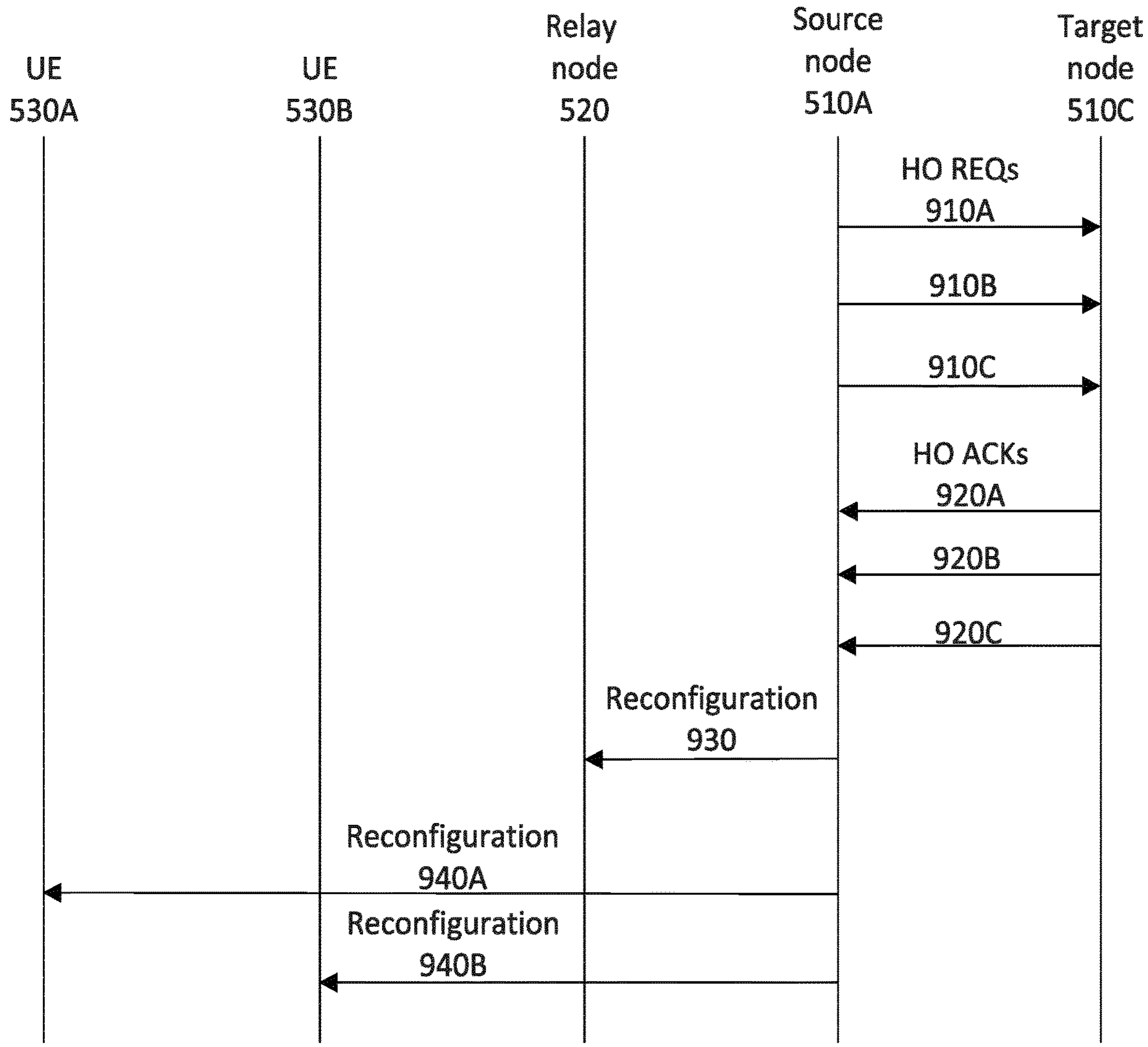
FIG. 9 illustrates signal transmissions in a second example handover process.

FIG. 9 shows a process for handover of the relay node 520 and the UEs 530A, 530B from the source node 510A to the target node 510C, where target node 510C is technically incapable of supporting the JAB functionality of the relay node 520. If the source node 510A were to send a single handover request to the target node including configuration information for the relay node 520 and the UEs 530A, 530B, the target node 520 may not comprehend the configuration. Accordingly, the target node 510C may initiate a full configuration for the relay node 520 (using known approaches), and may ignore (or not understand) the configuration information of the UEs 530A, 530B and thus the UEs 530A, 530B may not be handed over. In this case, source node 510A may release UEs 530A and 530B, for example using known signalling techniques. The UEs 530A, 530B may then enter an idle mode and perform cell selection/reselection to find a new suitable cell, and subsequently connect to the new cell.

Accordingly, in the present example the source node 510A transmits a handover request 910A for UE 530A, and a separate handover request for UE 530B, and may additionally transmit a further separate handover request 820C for the relay node 520. As such, the target node 510C is able to perform handover for each of the UEs 530A, 530B, as well as for the relay node 520, despite the target node 510C not supporting the JAB functionality of the relay node 520. The target node 510C therefore transmits handover request acknowledgements 920A, 920B for the UEs 530A, 530B to the source node 910A, and may also transmit a handover request acknowledgement for the relay node 520.

The source node 510A may, based on the handover request acknowledgements 920A, 920B, determine new configuration information for the UEs 530A, 530B, and transmit signals 940A, 940B containing the new configuration information to the UEs 530A, 530B, in the same manner as described above. As a result, the UEs 530A, 530B connect directly to the target node 510C. The UEs 530A, 530B may transmit, to the target node 510C, a reconfiguration complete message (e.g. an RRC reconfiguration complete message).

Furthermore, the source node 510A may, determine new configuration information for the relay node 520, for example where the relay node 520 is to operate as a conventional UE connected to the target node 510C. The new configuration for the relay node 520 may be determined based on the handover request acknowledgement 920C, or the new configuration for the relay node 520 may be determined by the source node 510A in advance of sending the handover request 910C (e.g. if the source node 510A has determined that the target node 510C will not support the JAB functionality of the relay node 520 before sending the handover request 910, as will be described below). Source node 510C may then transmit a signal 930 containing the new configuration information to the relay node 520, in the same manner as described above. Accordingly, the relay node 520 connects to the target node 510C and ceases to operate as a mobile JAB node, and instead operates as a conventional UE.

In some examples, the handover requests 910A-C may be transmitted in response to the source node 510A determining that the target node 510C does not support the JAB functionality of the relay node 520, where a handover request for the UEs 530A, 530B and relay node 520 has previously be sent. That is, the source node 510A may send an initial handover request to the target node 510C and may determine, after sending the initial handover request, that the target node 510C does not support the JAB functionality of the relay node 520. This determination may be made, for example, based on receiving no reply to the initial handover request, or may be made based on receiving an error message from the target node 510C. In response to determining that the target node 510C does not support the JAB functionality of the relay node 520, the source node 510A may then transmit separate handover requests 910A-C to the target node 510C, as described above. In examples, where the source node 510A determines that the target node 510C is technically incapable of supporting the JAB functionality of the relay node 520 (as opposed to not supporting the JAB functionality for policy or operational reasons) the handover requests 910A-C may be transmitted according to known handover request formats.

The source node 510A may release the JAB configuration of the relay node 520 prior to transmitting the handover requests 910 (or prior to handover request 910C), for example if the source node 510A is aware that the target node 510C will not support the mobile JAB functionality of the relay node. In other words, the source node 510A may signal to the relay node 520 that it is to stop operating as a mobile JAB node prior to issuing handover request(s) to the target node 510C.

In some examples, it may be advantageous for the source node 510A to know whether the target node 510C will support the JAB functionality of the relay node 520. For example, if the target node 510C is technically incapable of supporting the JAB functionality of the relay node 520, the source node 510A may be required to send separate handover requests for each device to be handed over to the target node 510C, whereas if the target node 510B will support the JAB functionality of the relay node 520, a single handover request can be transmitted to the target node or a new message can be transmitted.

Various types of signalling may be used in order to the source node 510A to determine whether the target node will support the JAB functionality of the relay node 520. For example, a target node 510B may indicate to the source node 510A whether it will support the JAB functionality of the relay node 520. This indication may be sent from the target node 510B to the source node 510A in response to a request from the source node 510A for the target node 510B to indicate whether it will support the JAB functionality of the relay node 520. For example, the indication may be sent from the target node 510B to the source node 510A as part of X2 setup signalling, or as part of OAM signalling. An indication may alternatively or additionally be included within a handover request acknowledgement 820, or in a RAN configuration update.

Additionally or alternatively, a target node 510B may broadcast an indication (i.e. an "iab-support" indication) that it will support JAB functionality for a given relay node 520. This indication broadcast may, in some examples, be included in system information signalled to the source node 510A (e.g. within X2 signalling). Accordingly, in response to receiving such a broadcast from a target node 510B, the source node 510A may determine that the target node 510B will support the JAB functionality of the relay node 520. As such, the relay node 520 may connect to the target node 510B if the indication is received by the source node 510A. This behaviour for a mobile relay node 520 is similar to that known for a fixed relay (JAB) node.

Alternatively or additionally, an indication of whether the target node 510B, 510C will support the JAB functionality of the relay node 520 may be included in system information transmitted to the mobile relay node 520 (which may be subsequently reported to the source node 510A by the relay node 520). Furthermore, a UE 530A, 530B may receive an indication broadcasted by the target node 510B, and may transmit a signal to the source node 510A reporting that the target node 510B, 510C will support (or will not support) the JAB functionality of the relay node 520 (for example as part of SON-ANR reporting). These approaches for allowing the source node 510A to determine whether a target node supports JAB functionality of a relay node 520 may be used an alternative or in addition to the other signalling techniques described above.

Target node 510C, which may be technically incapable of supporting the JAB functionality of the relay node 520, may be unable to send an indication that indicates that it will not support the JAB functionality of the relay node 520. Accordingly, in the absence of any explicit confirmation that the target node 510C will support the JAB functionality of the relay node 520, the source node 510A may assume that the target node 510C will not support the JAB functionality of the relay node 520. That is, the source node 510A will assume that target node 510C will not support the JAB functionality of the relay node 520 unless told otherwise.

For example, if source node 510A transmits a request for target node 510C to indicate whether it will support the JAB functionality of the relay node 520 (for example as part of X2 setup signalling), the target node 510C may not comprehend the request and as such may not respond to the request. Consequently, the source node 510A will determine that the target node 510C will not support the JAB functionality of the relay node 520, and will initiate the handover process as shown in FIG. 9. Similarly, if the source node 510A transmits a handover request to the target node 510C including JAB configuration information for the relay node 520, the target node 510C may not transmit a handover request acknowledgement to the source node 510A indicating that the target node 510C will support the JAB functionality of the relay node 520. Consequently, the source node 510A will determine that the target node 510C will not support the JAB functionality of the relay node 520, and will initiate the handover process as shown in FIG. 9. As such, a source node 510A is able to determine whether a target node 510B, 510C will support JAB functionality of a relay node 520. Therefore, in some cases, the source node 510A may send an initial handover request for multiple devices (such as UEs 530A, 530B and relay node 520) and may then transmit further separate handover requests for the devices to the target node 510C, based on determining that the target node 510C will not support the JAB functionality of the relay node 520.

Figure 10:
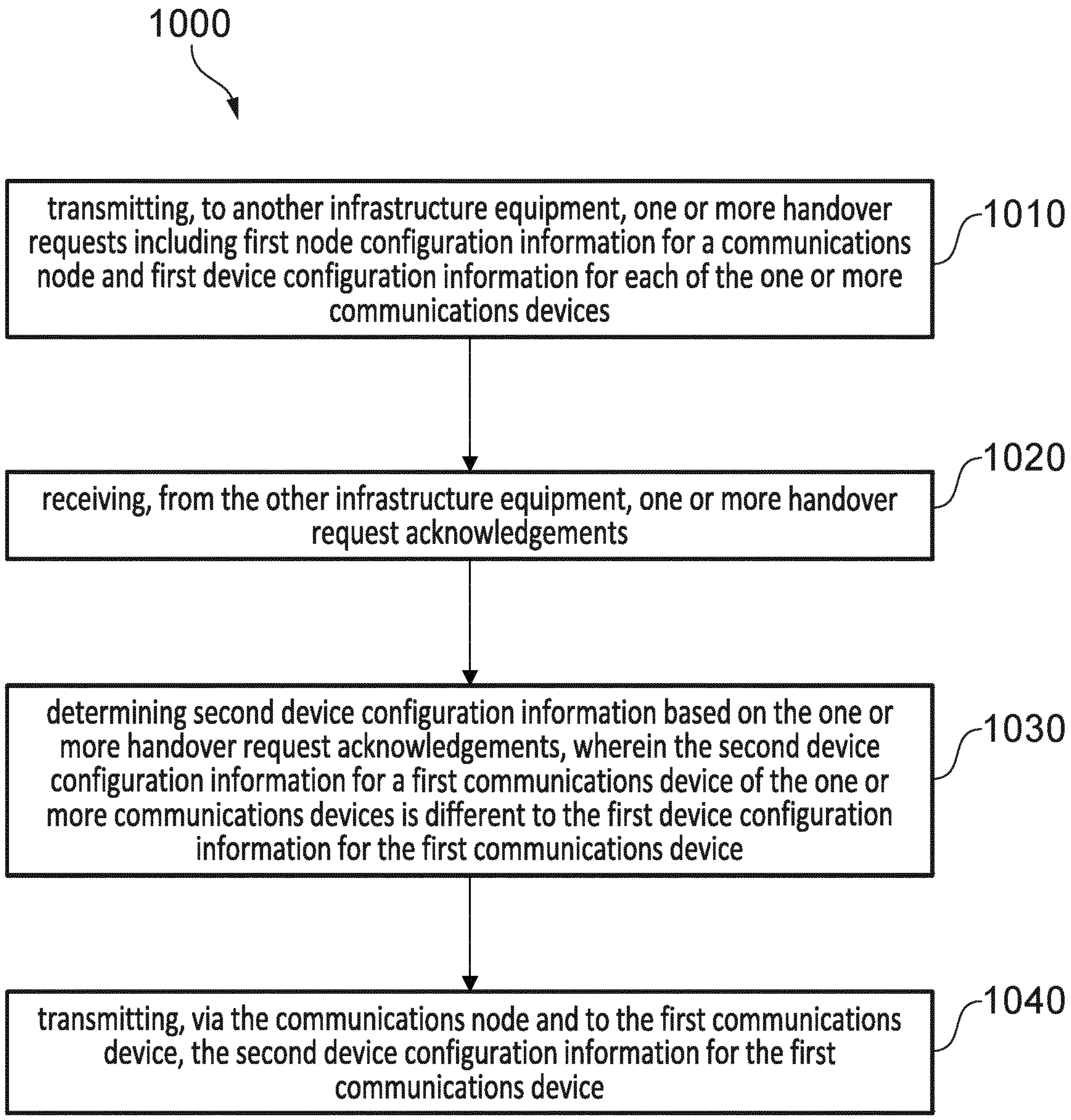
FIG. 10 shows an example method for an infrastructure equipment.

FIG. 10 shows a flowchart that illustrates an example a method 1000 for an infrastructure equipment configured to support a wireless backhaul configuration (such as source node 510A), wherein in the wireless backhaul configuration a communications node (such as relay node 520) is configured to provide a wireless backhaul between one or more communications devices (such as UEs 530A, 530B) and the infrastructure equipment. The method 1000 includes a step of transmitting 1010, to another infrastructure equipment (such as target node 510B, 510C), one or more handover requests including first node configuration information for the communications node and first device configuration information for each of the one or more communications devices.

The method further includes the steps of receiving 1020, from the other infrastructure equipment, one or more handover request acknowledgements, and determining 1030 second device configuration information based on the one or more handover request acknowledgements, wherein the second device configuration information for a first communications device is different to the first device configuration information for the first communications device. The method then proceeds to the step of transmitting 1040, via the communications node and to the first communications device, the second device configuration information for the first communications device.

Figure 11:
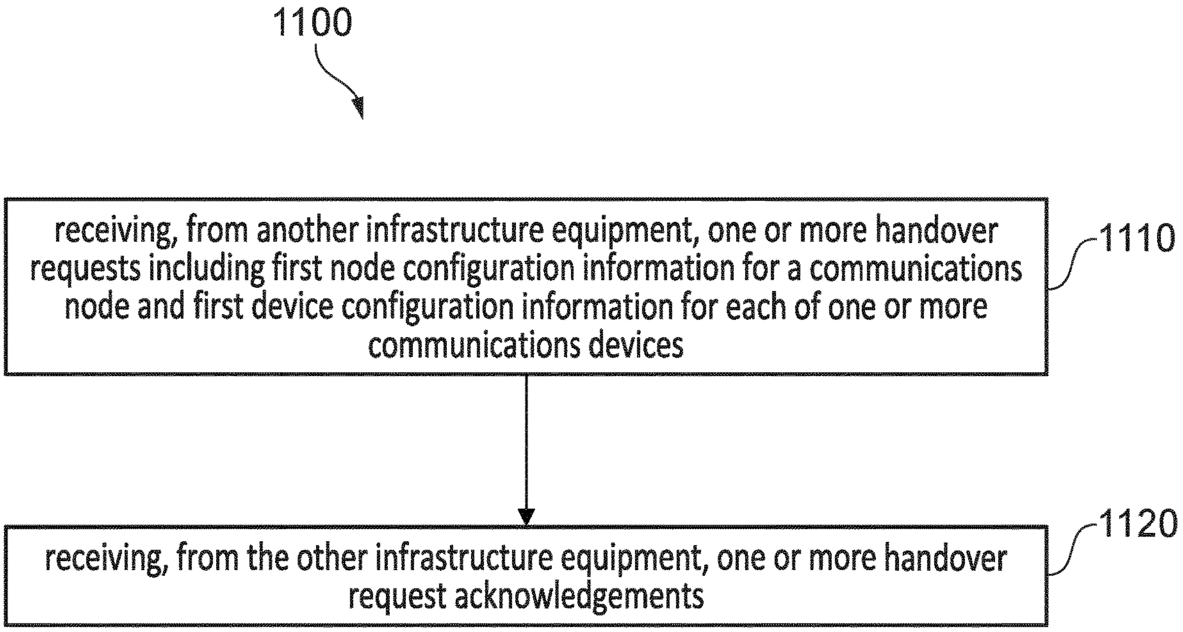
FIG. 11 shows an example method for an infrastructure equipment.

FIG. 11 shows a flowchart illustrates an example a method 1100 for an infrastructure equipment (such as target node 510B, 510C) for providing a wireless interface to a communications node (such as relay node 520) in a wireless communications network. The method includes a step of receiving 1110, from another infrastructure equipment (such as source node 510A), one or more handover requests including first node configuration information for a communications node and first device configuration information for each of one or more communications devices (such as UEs 530A, 530B), wherein the other infrastructure equipment is configured to support a wireless backhaul configuration, wherein in the wireless backhaul configuration a communications node is configured to provide a wireless backhaul between the one or more communications devices and the infrastructure equipment.

The method then proceeds to the step of transmitting 1120, to the other infrastructure equipment, one or more handover request acknowledgements, wherein the one or more handover request acknowledgements enable the other infrastructure equipment to determine second device configuration information based on the one or more handover request acknowledgements, wherein the second device configuration information for a first communications device is different to the first device configuration information for the first communications device.

Some examples of the present disclosure are set out in the following numbered clauses:

1. An infrastructure equipment for providing a wireless interface to a communications node in a wireless communications network, the infrastructure equipment configured to support a wireless backhaul configuration for the communications node, wherein in the wireless backhaul configuration the communications node is configured to provide a wireless backhaul between one or more communications devices and the infrastructure equipment, the infrastructure equipment comprising:

a transmitter configured to transmit, via a wireless access interface, signals to the communications node;

a receiver configured to receive, via the wireless access interface, signals from the communications node; and a controller configured to determine to handover the communications node to the other infrastructure equipment;

wherein the controller is further configured to operate with the transmitter and receiver to:

transmit, to the other infrastructure equipment, one or more handover requests including first node configuration information for the communications node and first device configuration information for each of the one or more communications devices;

receive, from the other infrastructure equipment, one or more handover request acknowledgements;

determine second device configuration information based on the one or more handover request acknowledgements, wherein the second device configuration information for a first communications device of the one or more communications devices is different to the first device configuration information for the first communications device;

transmit, via the communications node and to the first communications device, the second device configuration information for the first communications device.

2. The infrastructure equipment according to clause 1, wherein the controller is further configured to operate with the transmitter and receiver to:

determine second node configuration information based on the one or more handover request acknowledgements, wherein the second node configuration information is different to the first node configuration information; and transmit the second node configuration information to the communications node.

3. The infrastructure equipment according to clause 2, wherein the one or more handover request acknowledgements include the second node configuration information.

4. The infrastructure equipment according to clause 2 or clause 3, wherein the second node configuration information indicates that the communications node is to be reconfigured to exit the wireless backhaul configuration.

5. The infrastructure equipment according to any preceding clause, wherein the controller is configured to operate with the transmitter and receiver to transmit, the other infrastructure equipment, a plurality of handover requests comprising: a first handover request including the first node configuration information, and a second handover request for each of the one or more communications devices including first device configuration information for the respective one or more communications devices.

6. The infrastructure equipment according to any preceding clause, wherein one or more handover request acknowledgements include a first handover request acknowledgement for each of the one or more of communications devices.

7. The infrastructure equipment according to clause 6, wherein the one or more handover request acknowledgements further comprise a second handover request acknowledgement including the second node configuration information.

8. The infrastructure equipment according to any preceding clause, wherein the one or more handover request acknowledgements include the second device configuration information.

9. The infrastructure equipment according to any preceding clause, wherein the first node configuration includes one or more of channel configuration information, backhaul configuration information, and address configuration information.

10. The infrastructure equipment according to any preceding clause, wherein the controller is further configured to operate with the transmitter and receiver to: determine if the other infrastructure equipment will support the wireless backhaul configuration for the communications node.

11. The infrastructure equipment according to clause 10, wherein the controller is further configured to operate with the transmitter and receiver to: based on determining that the other infrastructure equipment will not support the wireless backhaul configuration for the communications node, transmit, to the communications node and prior to transmitting the one or more handover requests, a signal indicating that the communications node is to exit the wireless backhaul configuration for the communications node.

12. The infrastructure equipment according to clause 10 or clause 11, wherein the controller is configured to determine that the other infrastructure equipment will support the wireless backhaul configuration for the communications node based on the receiver receiving an indication that the other infrastructure equipment will support the wireless backhaul configuration for the communications node.

13. The infrastructure equipment according to clause 10 or clause 11, wherein the controller is configured to determine that the other infrastructure equipment will not support the wireless backhaul configuration for the communications node based on the receiver receiving an indication that the other infrastructure equipment will not support the wireless backhaul configuration for the communications node.

14. The infrastructure equipment according to clause 12 or 13, wherein the indication is received from at least one of the one or more communications devices.

15. The infrastructure equipment according to any of clauses 12-14, wherein the indication is received from the other infrastructure equipment.

16. The infrastructure equipment according to clause 15, wherein the indication is included in a message received by the infrastructure equipment, from the other infrastructure equipment, prior to transmitting the one or more handover requests.

17. The infrastructure equipment according to any of clauses 12-16, wherein the indication is included in the one or more handover request acknowledgements.

18. The infrastructure equipment according to any of clauses 10-17, wherein the controller is configured to determine that the other infrastructure equipment will not support the wireless backhaul configuration for the communications node based on not receiving an indication that the other infrastructure equipment will support the wireless backhaul configuration for the communications node.

19. The infrastructure equipment according to any preceding clause, wherein the controller is further configured to cause the transmitter to transmit, to the other infrastructure equipment, a request for the other infrastructure equipment to indicate if the other infrastructure equipment will support the wireless backhaul configuration for the communications node.

20. The infrastructure equipment according to any preceding clause, wherein the second device configuration information for the first communications device indicates that the first communications device is to connect directly to the other infrastructure equipment.

21. A method for an infrastructure equipment configured to support a wireless backhaul configuration for the communications node, wherein in the wireless backhaul configuration the communications node is configured to provide a wireless backhaul between one or more communications devices and the infrastructure equipment, the method comprising:

transmitting, to another infrastructure equipment, one or more handover requests including first node configuration information for the communications node and first device configuration information for each of the one or more communications devices;

receiving, from the other infrastructure equipment, one or more handover request acknowledgements;

determining second device configuration information based on the one or more handover request acknowledgements, wherein the second device configuration information for a first communications device of the one or more communications devices is different to the first device configuration information for the first communications device;

transmitting, via the communications node and to the first communications device, the second device configuration information for the first communications device.

22. Circuitry for an infrastructure equipment configured to support a wireless backhaul configuration for a communications node, wherein in the wireless backhaul configuration the communications node is configured to provide a wireless backhaul between one or more communications devices and the infrastructure equipment, wherein the circuitry is configured to:

transmit, to another infrastructure equipment, one or more handover requests including first node configuration information for the communications node and first device configuration information for each of the one or more communications devices;

receive, from the other infrastructure equipment, one or more handover request acknowledgements;

determine second device configuration information based on the one or more handover request acknowledgements, wherein the second device configuration information for a first communications device of the one or more communications devices is different to the first device configuration information for the first communications device;

transmit, via the communications node and to the first communications device, the second device configuration information for the first communications device.

23. An infrastructure equipment for providing a wireless interface to a communications node in a wireless communications network, the infrastructure equipment comprising:

a transmitter configured to transmit, via a wireless access interface, signals to the communications node and to another infrastructure equipment, the infrastructure equipment configured to support a wireless backhaul configuration for a communications node, wherein in the wireless backhaul configuration communications node is configured to provide a wireless backhaul between one or more communications devices and the infrastructure equipment;

a receiver configured to receive, via the wireless access interface, signals from the communications node and the other infrastructure equipment; and a controller is further configured to operate with the transmitter and receiver to:

receive, from the other infrastructure equipment, one or more handover requests including first node configuration information for the communications node and first device configuration information for each of the one or more communications devices;

transmit, to the other infrastructure equipment, one or more handover request acknowledgements, wherein the one or more handover request acknowledgements enable the other infrastructure equipment to determine second device configuration information based on the one or more handover request acknowledgements, wherein the second device configuration information for a first communications device of the one or more communications devices is different to the first device configuration information for the first communications device.

24. The infrastructure equipment according to clause 23, wherein one or more handover request acknowledgements enable the other infrastructure equipment to determine second node configuration information based on the one or more handover request acknowledgements, wherein the second node configuration information is different to the first node configuration information.

25. The infrastructure equipment according to clause 24, wherein the one or more handover request acknowledgements include the second node configuration information.

26. The infrastructure equipment according to clause 2242 or clause 25, wherein the second node configuration information indicates that the communications node is to be reconfigured to exit the wireless backhaul configuration.

27. The infrastructure equipment according to any of clauses 23-26, wherein the infrastructure equipment will support the wireless backhaul configuration for the communications node.

28. The infrastructure equipment according to any of clauses 23-26, wherein the infrastructure equipment will not support the wireless backhaul configuration for the communications node.

29. The infrastructure equipment according to clause 28, wherein the controller is configured to operate with the transmitter and receiver to:

receive, from the other infrastructure equipment, a plurality of handover requests comprising: a first handover request including the first node configuration information, and a second handover request for each of the one or more communications devices including first device configuration information for the respective one or more communications devices.

30. The infrastructure equipment according to clause 28 or 29, wherein the one or more handover request acknowledgements include a first handover request acknowledgement for each of the one or more of communications devices.

31. The infrastructure equipment according to clause 30, wherein the one or more handover request acknowledgements further comprises a second handover request acknowledgement including the second node configuration information.

32. The infrastructure equipment according to any of clauses 28-31, wherein the controller is configured to determine that the infrastructure equipment will not support the wireless backhaul configuration.

33. The infrastructure equipment according to clause 32, wherein the controller is configured to determine that the infrastructure equipment will not support the wireless backhaul configuration for the communications node based a level of congestion at the infrastructure equipment.

34. The infrastructure equipment according to according to any of clauses 23-33, wherein the controller is configured to operate with the transmitter and receiver to:

transmit, an indication of whether the infrastructure equipment will support the wireless backhaul configuration for the communications node.

35. The infrastructure equipment according to according to clause 34, wherein the controller is configured to operate with the transmitter and receiver to transmit the indication to the other infrastructure equipment.

36. The infrastructure equipment according to according to clause 34 or 35, wherein the controller is configured to operate with the transmitter and receiver to broadcast the indication.

37. The infrastructure equipment according to any of clauses 34-36, wherein the controller is configured to operate with the transmitter and receiver to transmit, prior to receiving the one or more handover requests and to the infrastructure equipment, the indication.

38. The infrastructure equipment according to according to any of clauses 34-37, wherein the controller is configured to operate with the transmitter and receiver to include the indication within the one or more handover request acknowledgements.

39. The infrastructure equipment according to any of clauses 23-37, wherein the controller is further configured to operate with the transmitter and receiver to receive, from the other infrastructure equipment, a request for an indication of whether the infrastructure equipment will support the wireless backhaul configuration for the communications node.

40. The infrastructure equipment according to any of clauses 23-39, wherein the one or more handover request acknowledgements include the second device configuration information.

41. The infrastructure equipment according to any of clauses 23-40, wherein the first node configuration includes one or more of channel configuration information, backhaul configuration information, and address configuration information.

42. The infrastructure equipment according to of clauses 23-41, wherein the second device configuration information for the first communications device indicates that the first communications device is to connect directly to the other infrastructure equipment.

43. A method for an infrastructure equipment for providing a wireless interface to a communications node in a wireless communications network, the method comprising:

receiving, from another infrastructure equipment, one or more handover requests including first node configuration information for a communications node and first device configuration information for each of one or more communications devices, wherein the other infrastructure equipment is configured to support a wireless backhaul configuration for the communications node, wherein in the wireless backhaul configuration a communications node is configured to provide a wireless backhaul between the one or more communications devices and the infrastructure equipment; and transmitting, to the other infrastructure equipment, one or more handover request acknowledgements, wherein the one or more handover request acknowledgements enable the other infrastructure equipment to determine second device configuration information based on the one or more handover request acknowledgements, wherein the second device configuration information for a first communications device of the one or more communications devices is different to the first device configuration information for the first communications device.

44. Circuitry for an infrastructure equipment an infrastructure equipment for providing a wireless interface to a communications node in a wireless communications network, wherein the circuitry is configured to:

receive, from another infrastructure equipment, one or more handover requests including first node configuration information for a communications node and first device configuration information for each of one or more communications devices, wherein the other infrastructure equipment is configured to support a wireless backhaul configuration for the communications node, wherein in the wireless backhaul configuration a communications node is configured to provide a wireless backhaul between the one or more communications devices and the infrastructure equipment; and transmit, to the other infrastructure equipment, one or more handover request acknowledgements, wherein the one or more handover request acknowledgements enable the other infrastructure equipment to determine second device configuration information based on the one or more handover request acknowledgements, wherein the second device configuration information for a first communications device of the one or more communications devices is different to the first device configuration information for the first communications device.

45. A communications device, the communications device configured to:

receive, from an infrastructure equipment for providing a wireless interface to a communications node in a wireless communications network, an indication of whether the infrastructure equipment will support a wireless backhaul configuration for the communications node, wherein in the wireless backhaul configuration the communications node is configured to provide a wireless backhaul between one or more communications devices and the infrastructure equipment;

transmit, to another infrastructure equipment and based on the indication, a signal indicating whether the infrastructure equipment will support the wireless backhaul configuration for the communications node.

46. A method for a communications device, the method comprising:

receiving, from an infrastructure equipment for providing a wireless interface to a communications node in a wireless communications network, an indication of whether the infrastructure equipment will support a wireless backhaul configuration for the communications node, wherein in the wireless backhaul configuration the communications node is configured to provide a wireless backhaul between one or more communications devices and the infrastructure equipment;

transmitting, to another infrastructure equipment and based on the indication, a signal indicating whether the infrastructure equipment will support the wireless backhaul configuration for the communications node.

47. Circuitry for a communications device, the circuitry configured to:

receive, from an infrastructure equipment for providing a wireless interface to a communications node in a wireless communications network, an indication of whether the infrastructure equipment will support a wireless backhaul configuration for the communications node, wherein in the wireless backhaul configuration the communications node is configured to provide a wireless backhaul between one or more communications devices and the infrastructure equipment;

transmit, to another infrastructure equipment and based on the indication, a signal indicating whether the infrastructure equipment will support the wireless backhaul configuration for the communications node.

48. A communications node, the communications node configured to:

receive, from an infrastructure equipment for providing a wireless interface to the communications node in a wireless communications network, an indication of whether the infrastructure equipment will support a wireless backhaul configuration for the communications node, wherein in the wireless backhaul configuration the communications node is configured to provide a wireless backhaul between one or more communications devices and the infrastructure equipment;

transmit, to another infrastructure equipment and based on the indication, a signal indicating whether the infrastructure equipment will support the wireless backhaul configuration for the communications node.

49. A method for a communications node, the method comprising:

receiving, from an infrastructure equipment for providing a wireless interface to the communications node in a wireless communications network, an indication of whether the infrastructure equipment will support a wireless backhaul configuration for the communications node, wherein in the wireless backhaul configuration the communications node is configured to provide a wireless backhaul between one or more communications devices and the infrastructure equipment;

transmitting, to another infrastructure equipment and based on the indication, a signal indicating whether the infrastructure equipment will support the wireless backhaul configuration for the communications node.

50. Circuitry for a communications node, the circuitry configured to:

receive, from an infrastructure equipment for providing a wireless interface to the communications node in a wireless communications network, an indication of whether the infrastructure equipment will support a wireless backhaul configuration for the communications node, wherein in the wireless backhaul configuration the communications node is configured to provide a wireless backhaul between one or more communications devices and the infrastructure equipment;

transmit, to another infrastructure equipment and based on the indication, a signal indicating whether the infrastructure equipment will support the wireless backhaul configuration for the communications node.

Numerous modifications and variations of the present disclosure are possible in light of the above teachings. It is therefore to be understood that, within the scope of the claims, the disclosure may be practiced otherwise than as specifically described herein.

In so far as embodiments of the disclosure have been described as being implemented, at least in part, by one or more software-controlled information processing apparatuses, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more computer processors (e.g. data processors and/or digital signal processors). The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to these embodiments. Additionally, although a feature may appear to be described in connection with particular embodiments, one skilled in the art would recognize that various features of the described embodiments may be combined in any manner suitable to implement the present disclosure.

REFERENCES

[1] Holma H. and Toskala A, "LTE for UMTS OFDMA and SC-FDMA based radio access", John Wiley and Sons, 2009.

[2] 3GPP TR 36.746 V1.1.0

The invention claimed is:

1. An infrastructure equipment for providing a wireless access interface to a communications node in a wireless communications network, the infrastructure equipment configured to support a wireless backhaul configuration for the communications node, wherein in the wireless backhaul configuration the communications node is configured to provide a wireless backhaul between one or more communications devices and the infrastructure equipment, the infrastructure equipment comprising:

a transmitter configured to transmit, via the wireless access interface, signals to the communications node;

a receiver configured to receive, via the wireless access interface, signals from the communications node; and a controller configured to determine to handover the communications node to another infrastructure equipment;

wherein the controller is further configured to operate with the transmitter and receiver to:

transmit, to the other infrastructure equipment, one or more handover requests including (1) first node configuration information for configuring a connection between the infrastructure equipment and the communications node and (2) first device configuration information for each of the one or more communications devices;

receive, from the other infrastructure equipment, one or more handover request acknowledgements;

determine second device configuration information based on the one or more handover request acknowledgements, wherein the second device configuration information for a first communications device of the one or more communications devices is different to the first device configuration information for the first communications device;

transmit, via the communications node and to the first communications device, the second device configuration information for the first communications device.

2. The infrastructure equipment according to claim 1, wherein the controller is configured to operate with the transmitter and receiver to transmit, to the other infrastructure equipment, a plurality of handover requests comprising:

a first handover request including the first node configuration information, and a second handover request for each of the one or more communications devices including first device configuration information for the respective one or more communications devices.

3. The infrastructure equipment according to claim 1, wherein the one or more handover request acknowledgements include a first handover request acknowledgement for each of the one or more communications devices.

4. The infrastructure equipment according to claim 3, wherein the one or more handover request acknowledgements further comprise a second handover request acknowledgement including second node configuration information.

5. The infrastructure equipment according to claim 1, wherein the one or more handover request acknowledgements include the second device configuration information.

6. The infrastructure equipment according to claim 1, wherein the first node configuration information includes one or more of channel configuration information, backhaul configuration information, and address configuration information.

7. The infrastructure equipment according to claim 1, wherein the controller is further configured to operate with the transmitter and receiver to: determine if the other infrastructure equipment will support the wireless backhaul configuration for the communications node.

8. The infrastructure equipment according to claim 7, wherein the controller is further configured to operate with the transmitter and receiver to: based on determining that the other infrastructure equipment will not support the wireless backhaul configuration for the communications node, transmit, to the communications node and prior to transmitting the one or more handover requests, a signal indicating that the communications node is to exit the wireless backhaul configuration for the communications node.

9. The infrastructure equipment according to claim 7, wherein the controller is configured to determine that the other infrastructure equipment will support the wireless backhaul configuration for the communications node based on the receiver receiving an indication that the other infrastructure equipment will support the wireless backhaul configuration for the communications node.

10. The infrastructure equipment according to claim 9, wherein the indication is included in a message received by the infrastructure equipment, from the other infrastructure equipment, prior to transmitting the one or more handover requests.

11. The infrastructure equipment according to claim 9, wherein the indication is included in the one or more handover request acknowledgements.

12. The infrastructure equipment according to claim 7, wherein the controller is configured to determine that the other infrastructure equipment will not support the wireless backhaul configuration for the communications node based on the receiver receiving an indication that the other infrastructure equipment will not support the wireless backhaul configuration for the communications node.

13. The infrastructure equipment according to claim 7, wherein the controller is configured to determine that the other infrastructure equipment will not support the wireless backhaul configuration for the communications node based on not receiving an indication that the other infrastructure equipment will support the wireless backhaul configuration for the communications node.

14. The infrastructure equipment according to claim 1, wherein the controller is further configured to cause the transmitter to transmit, to the other infrastructure equipment, a request for the other infrastructure equipment to indicate if the other infrastructure equipment will support the wireless backhaul configuration for the communications node.

15. The infrastructure equipment according to claim 1, wherein the second device configuration information for the first communications device indicates that the first communications device is to connect directly to the other infrastructure equipment.

16. An infrastructure equipment for providing a wireless access interface to a communications node in a wireless communications network, the infrastructure equipment comprising:

a transmitter configured to transmit, via the wireless access interface, signals to the communications node and to another infrastructure equipment, the infrastructure equipment configured to support a wireless backhaul configuration for a communications node, wherein in the wireless backhaul configuration the communications node is configured to provide a wireless backhaul between one or more communications devices and the infrastructure equipment;

a receiver configured to receive, via the wireless access interface, signals from the communications node and the other infrastructure equipment; and a controller is further configured to operate with the transmitter and receiver to:

receive, from the other infrastructure equipment, one or more handover requests including (1) first node configuration information for configuring a connection between the infrastructure equipment and the communications node and (2) first device configuration information for each of the one or more communications devices;

transmit, to the other infrastructure equipment, one or more handover request acknowledgements, wherein the one or more handover request acknowledgements enable the other infrastructure equipment to determine second device configuration information based on the one or more handover request acknowledgements, wherein the second device configuration information for a first communications device of the one or more communications devices is different to the first device configuration information for the first communications device.

17. A device, the device configured to:

receive, from an infrastructure equipment for providing a wireless interface to a communications node in a wireless communications network, an indication of whether the infrastructure equipment will support a wireless backhaul configuration for configuring a connection between the infrastructure equipment and the communications node, wherein in the wireless backhaul configuration the communications node is configured to provide a wireless backhaul between one or more communications devices and the infrastructure equipment;

transmit, to another infrastructure equipment and based on the indication, a signal indicating whether the infrastructure equipment will support the wireless backhaul configuration for configuring a connection between the infrastructure equipment and the communications node.

18. The device according to claim 17, wherein the device is a communications device of the one or more communications devices, or wherein the device is the communications node.

* * * * *